(12) United States Patent
Yeum

(10) Patent No.: US 9,517,566 B2
(45) Date of Patent: Dec. 13, 2016

(54) TEST GRIPPER AND TEST METHOD USING THE SAME

(71) Applicant: Hyundai Motor Company, Seoul (KR)

(72) Inventor: Jung Whan Yeum, Chungcheongbuk-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/716,277

(22) Filed: May 19, 2015

(65) Prior Publication Data

US 2016/0151919 A1    Jun. 2, 2016

(30) Foreign Application Priority Data

Nov. 28, 2014 (KR) ........................ 10-2014-0168724

(51) Int. Cl.
*B66F 19/00* (2006.01)
*B25J 15/00* (2006.01)

(52) U.S. Cl.
CPC .................................. *B25J 15/009* (2013.01)

(58) Field of Classification Search
CPC ..... B25J 15/00; B25J 15/0206; B25J 15/0009; B25J 15/0052; B66C 1/663; B66C 1/422; B66C 1/02; E21B 31/125; E02F 3/404
USPC ............ 294/86.4, 81.2, 81.61, 192, 197, 65, 86.1,294/902, 907; 901/37, 39; 414/729, 736
See application file for complete search history.

(56) References Cited

U.S. PATENT DOCUMENTS

| | | | | |
|---|---|---|---|---|
| 4,961,257 A | * | 10/1990 | Sakamoto | B62D 65/06 29/822 |
| 5,181,307 A | * | 1/1993 | Kitahama | B62D 65/06 29/11 |
| 6,435,582 B1 | * | 8/2002 | DaSilva | B25J 15/0052 294/87.1 |
| 8,592,714 B2 | | 11/2013 | Yeum | |
| 2006/0015211 A1 | | 1/2006 | Kolb et al. | |
| 2006/0107507 A1 | | 5/2006 | Brose et al. | |
| 2006/0107508 A1 | | 5/2006 | Bonse et al. | |
| 2006/0137164 A1 | | 6/2006 | Kraus | |
| 2007/0017081 A1 | | 1/2007 | Becker et al. | |
| 2011/0089709 A1 | * | 4/2011 | Neeper | B25J 9/102 294/119.1 |
| 2011/0133501 A1 | | 6/2011 | Yeum et al. | |
| 2012/0056440 A1 | | 3/2012 | Yeum | |
| 2012/0145682 A1 | | 6/2012 | Yeum | |
| 2012/0267035 A1 | * | 10/2012 | Maiorino | A61B 17/06166 156/73.1 |

(Continued)

FOREIGN PATENT DOCUMENTS

CN    103313908 A    9/2013
JP    S61-150878 A    7/1986

(Continued)

*Primary Examiner* — Stephen Vu
(74) *Attorney, Agent, or Firm* — Mintz Levin Cohn Ferris Glovsky and Popeo, P.C.; Peter F. Corless

(57) ABSTRACT

A test gripper is provided that decreases an equipment cost and increases a test precision by integrating and simplifying a jig and a test apparatus into the gripper. The test gripper is configured to align and test a component and includes a frame that has a mounting part installed on a robot arm. In addition, a plurality of pins are installed on the frame and are fitted into apertures of the component to align the component and the test gripper. A measuring sensor is also installed on the frame and is configured to test a precision of the component.

16 Claims, 10 Drawing Sheets

(56) References Cited

U.S. PATENT DOCUMENTS

2013/0192391 A1*  8/2013  Bruehwiler ............. G01N 1/08
                                              73/863.01

FOREIGN PATENT DOCUMENTS

| JP | 2012-140023 A | 7/2012 |
|---|---|---|
| KR | 20-1999-0025310 U | 7/1999 |
| KR | 10-2009-0053078 A | 5/2009 |
| KR | 10-2011-0063144 A | 6/2011 |
| KR | 10-2012-0063773 A | 6/2012 |
| KR | 10-1172308 B1 | 8/2012 |
| KR | 10-2014-0100197 A | 8/2014 |
| WO | 2004/026672 A2 | 4/2004 |

* cited by examiner

TEST GRIPPER AND TEST METHOD USING THE SAME

CROSS-REFERENCE TO RELATED APPLICATION

This application is based on and claims the benefit of priority to Korean Patent Application No. 10-2014-0168724, filed on Nov. 28, 2014 in the Korean Intellectual Property Office, the disclosure of which is incorporated herein in its entirety by reference.

TECHNICAL FIELD

The present disclosure relates to a gripper for testing a component, and more particular to a gripper that reduces an equipment cost and increases a test precision by integrating and simplifying a jig and a test apparatus into the gripper.

BACKGROUND

When components of an automobile are produced, a test for confirming the precision of the produced components is performed. For example, for a door assembly according to the related art, as shown in FIG. 1, when a gripper G to which the door assembly is fixed is placed on a jig J using a six-axis robot arm R and the jig moves forward toward a test module T by a pneumatic cylinder to be fixed to an appropriate position, components have been tested using various test sensors within the test module T to confirm the precision of the components (e.g., measurements and the like) while being moved.

However, in the equipment according to the related art, a system is configured of three parts, thus increasing an equipment cost, and since different grippers and jigs are used for each type of vehicle and each component an investment cost is increased whenever a type kind of vehicle is developed. In addition, since the gripper is fixed onto the jig and the jig moves forward by the pneumatic cylinder, a precision of a test is deteriorated. Further, in an existing test scheme, since a mechanism is thermally expanded based on a temperature change to adjust a calibration block and position, a precision of a test is deteriorated.

SUMMARY

The present disclosure provides a test gripper that improves a test precision by integrating various equipments for testing components into one gripper and allowing this test equipment to test other types of vehicles and other components.

According to the present disclosure, a test gripper may include a frame that maintains a shape of an apparatus, a pin module that allows a coordinate system of a component to be tested and a coordinate system of the test gripper to coincide with each other, a measuring sensor configured to test a panel, and a rotating and moving module configured to move the measuring sensor.

According to an exemplary embodiment of the present disclosure, a test gripper configured to align and test a component may include: a frame having a mounting part mounted on a robot arm; pins installed on the frame and fitted into apertures of the component to align the component and the test gripper; and a measuring sensor installed on the frame and configured to test a precision of the component. A pin module arm may be installed in the frame, the pins may be installed on the pin module arm, and the number of pins may be two or more. Additionally, the pin may be installed to be movable in a lengthwise direction of the pin module arm along a rail installed on the pin module arm. The pin may be installed on a moving part that moves along the rail by a transfer apparatus.

An apparatus configured to vertically move the pin may be installed on the moving part. A measuring module arm may be installed on the frame, and the measuring sensor may be installed on the measuring module. In addition, the measuring module arm may be installed to be rotatable with respect to the frame. The measuring module arm may also be rotated by a motor installed in the frame.

A horizontal rail may be installed at the measuring module arm in a lengthwise direction of the measuring module arm, and the measuring sensor may be moved by a horizontal transfer apparatus along the horizontal rail. A vertical rail may be installed on the measuring module arm in a direction that is perpendicular to a lengthwise direction of the measuring module arm and may be in parallel with a rotation axis of the measuring module arm, and the measuring sensor may be transferred along the vertical rail by a vertical transfer apparatus. A horizontal rail may be installed in the lengthwise direction of the measuring module arm, and the vertical rail may be moved along the horizontal rail by a horizontal transfer apparatus.

According to another exemplary embodiment of the present disclosure, a component test method using the test gripper as described above may include: allowing the test gripper to approach a fixed component; fitting the pin into the aperture of the component to align the component and the test gripper; and testing a precision of the component using the measuring sensor. The pin may be lowered with respect to the gripper to fit the pin into the aperture. A position of the measuring sensor may be adjusted based on rotation of the measuring module arm. Additionally, the position of the measuring sensor may be adjusted based on movement in a vertical direction perpendicular to a lengthwise direction of the measuring module arm and a length direction of a measuring direction.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

It is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Hereinafter, exemplary embodiments of the present disclosure will be described with reference to the accompanying drawings.

Figure 1:
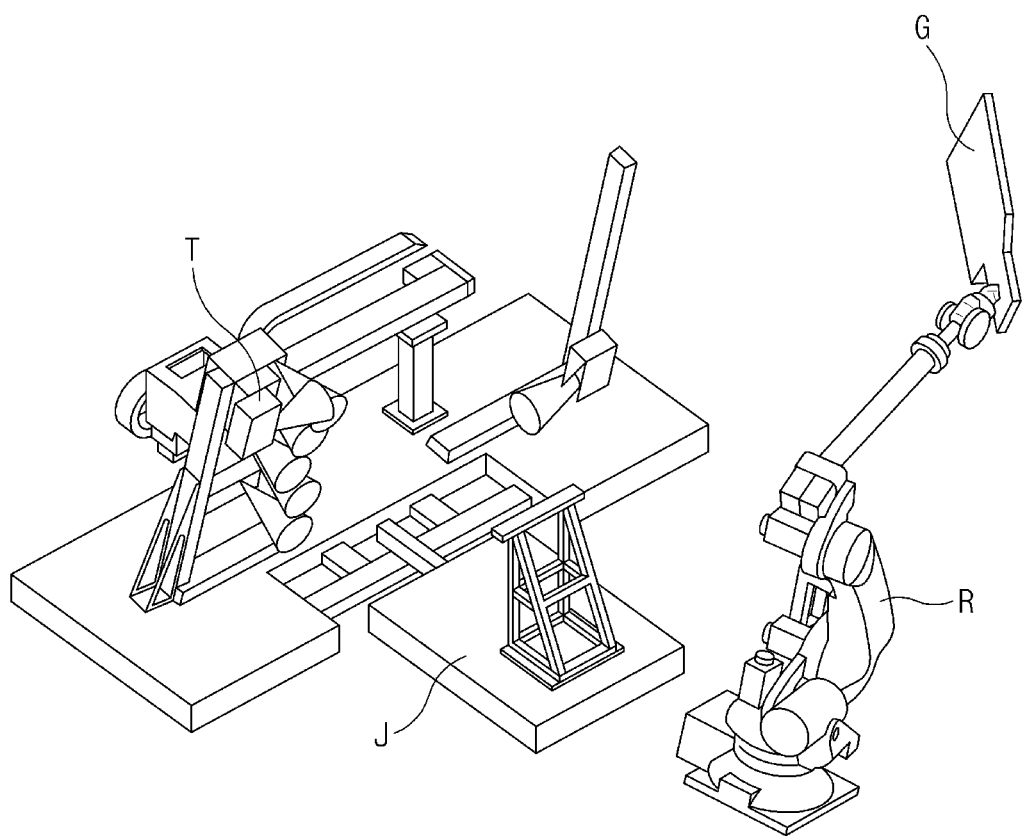
FIG. 1 is an exemplary view showing a component test system according to the related art.
Figure 2:
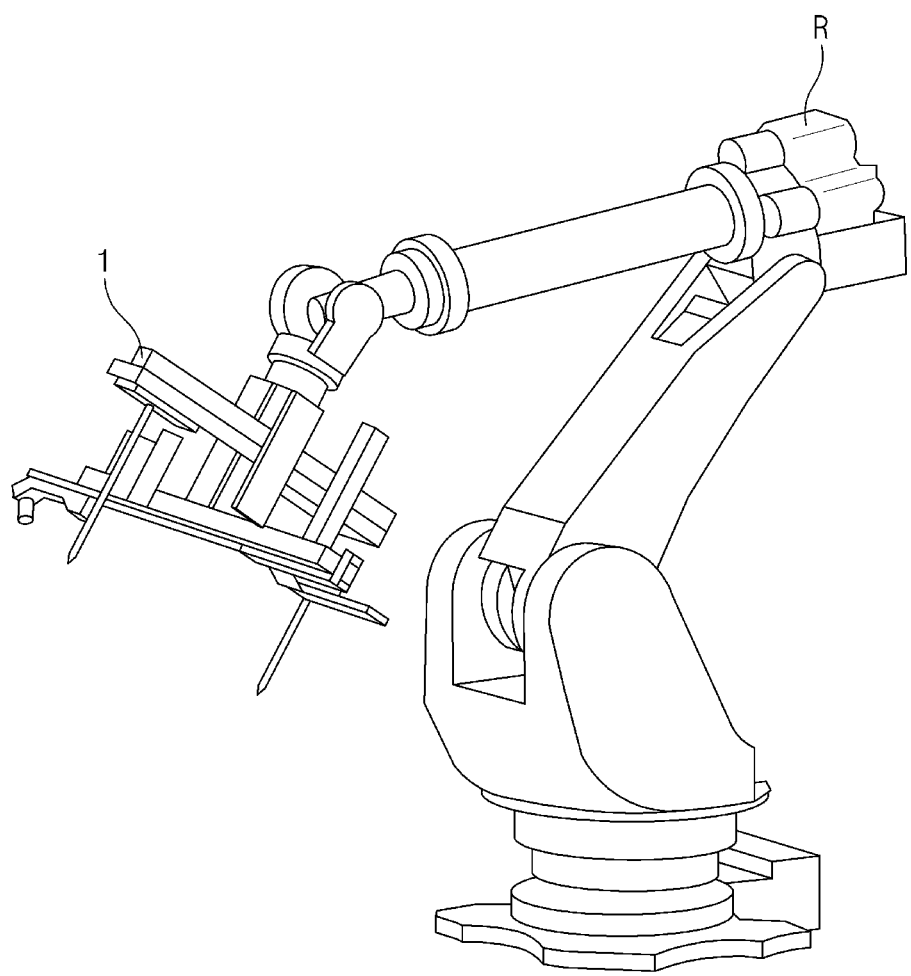
FIG. 2 is an exemplary view showing a state in which a test gripper according to an exemplary embodiment of the present disclosure is installed at a robot arm.
Figure 3:
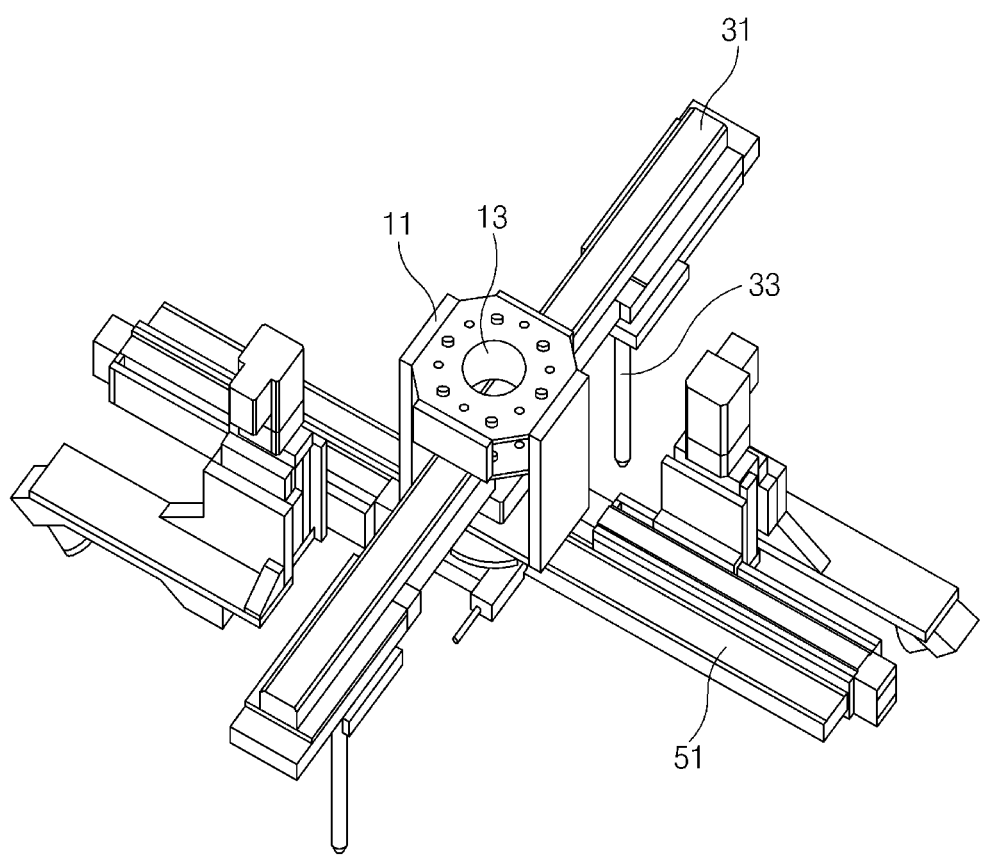
FIG. 3 is an exemplary top view of the test gripper according to an exemplary embodiment of the present disclosure.
Figure 4:
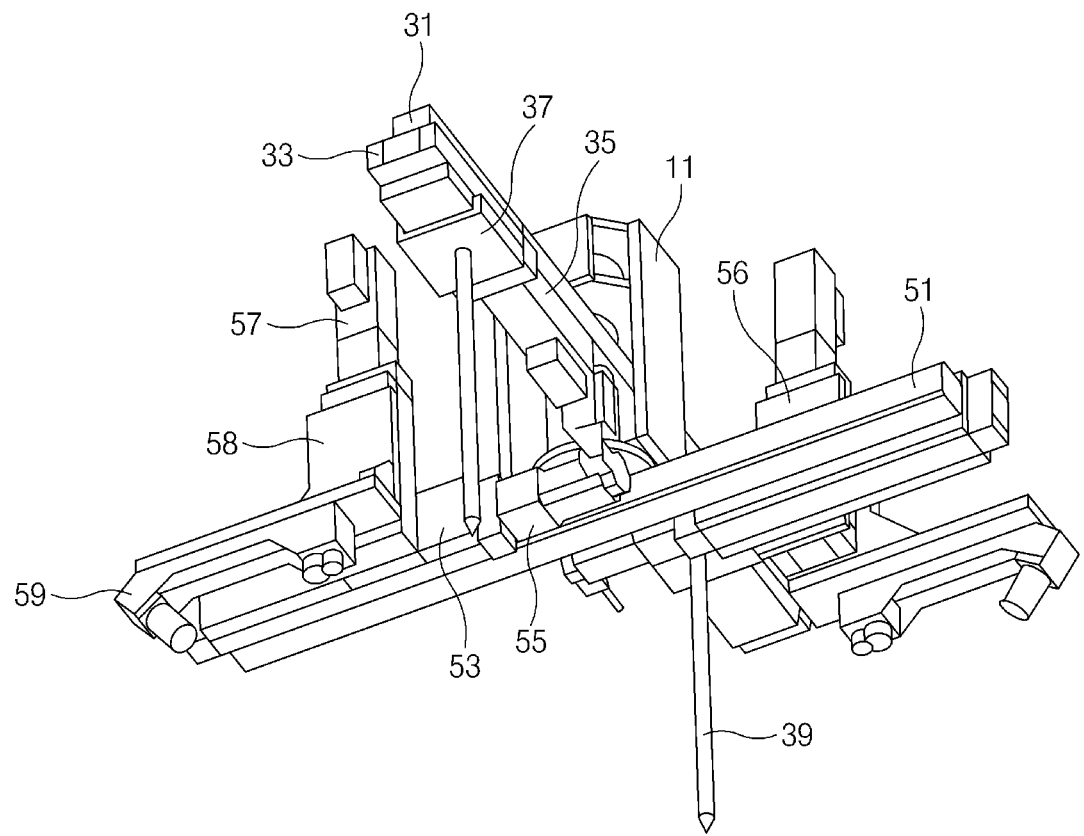
FIG. 4 is an exemplary bottom view of the test gripper according to an exemplary embodiment of the present disclosure.
Figure 5:
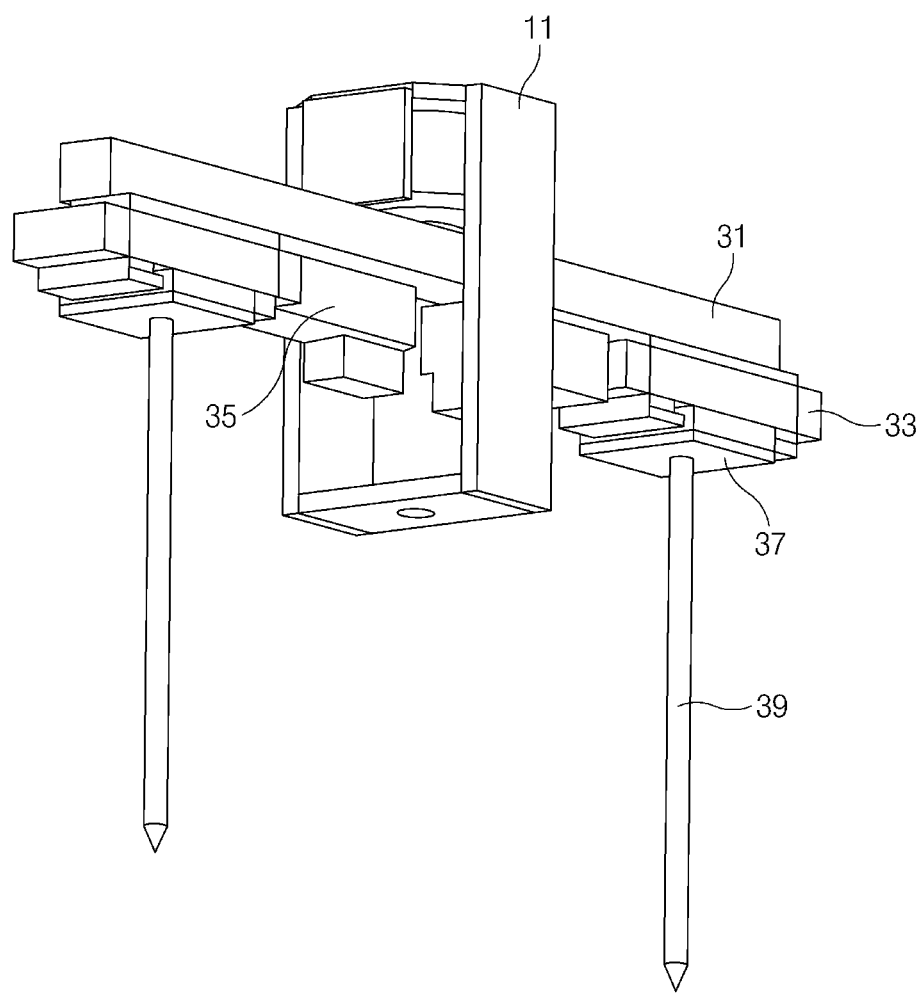
FIG. 5 is an exemplary view showing a state in which a measuring module is omitted from the test gripper according to an exemplary embodiment of the present disclosure.

FIG. 2 is an exemplary view showing a state in which a test gripper according to an exemplary embodiment of the present disclosure is installed at a robot arm; FIG. 3 is an exemplary top view of the test gripper according to an exemplary embodiment of the present disclosure; FIG. 4 is an exemplary bottom view of the test gripper according to an exemplary embodiment of the present disclosure; and FIG. 5 is an exemplary view showing a state in which a measuring module is omitted from the test gripper according to an exemplary embodiment of the present disclosure.

The test gripper 1 according to an exemplary embodiment of the present disclosure may be an apparatus configured to align and test a component. As shown in FIG. 2, the test gripper 1 according to an exemplary embodiment of the present disclosure may be installed at a six-axis robot arm and be moved to an appropriate position and in an appropriate direction with respect to the component. The test gripper according to an exemplary embodiment of the present disclosure may be mainly divided into a frame 11 that becomes a body, a pin module configured to align the test gripper with respect to the component, and a measuring module configured to test the test gripper.

The frame 11 may include a mounting part 13 mounted on an upper surface thereof, wherein the mounting part 13 may be fastened to a robot arm R. The frame 11 may have a square pillar shape, a shape in which two side surfaces thereof opposing among four side surfaces thereof are opened, and may have an aperture formed in the bottom thereof to allow a shaft of a motor to be described below to penetrate therethrough.

A pin module arm 31 having a shape in which it is extended toward the two side surfaces that are opened may be installed at an upper portion of an internal space of the frame 11. A rail 33 in which a guide slit is formed may be installed in a lengthwise direction of the pin module arm 31 on the pin module arm 31, and moving parts 37 movable in a lengthwise direction of the rail 33 along the guide slit may be installed on the rail 33. The moving parts 37 may be moved by a transfer apparatus 35 such as a linear motor.

Additionally, 39 may be installed in a downward direction below the moving parts 37. In particular, the pins 39 may be installed to be fixed to the moving parts 37 or be installed on the moving parts in a structure in which they are installed on an apparatus (not shown) moving the pins in a vertical direction with respect to the moving parts 37. The number of pins may be two or more for alignment. In addition, a plurality of pin module arms may be provided, if necessary.

Figure 9:
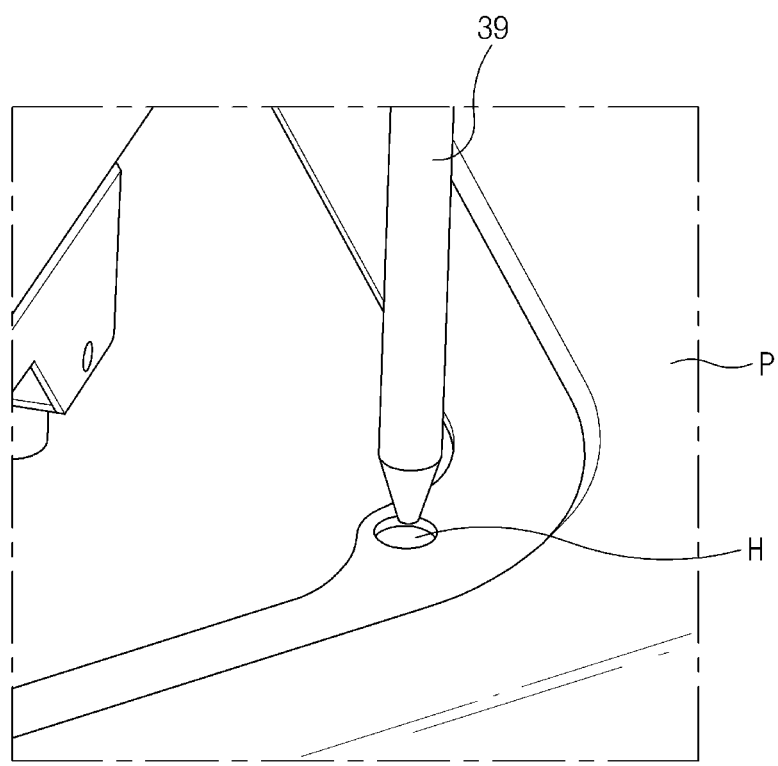
FIG. 9 is an exemplary view showing a state in which a pin of the test gripper according to an exemplary embodiment of the present disclosure is fitted into an aperture of a component.

When the pin 39 is fitted into an aperture (e.g., a hole) H formed in a component P as shown in FIG. 9, the test gripper may be aligned with respect to the component by interference of the pin and the aperture. According to an exemplary embodiment of the present disclosure, since the pins 39 may be movable in the lengthwise direction from the pin module arm 31, when two pins 39 are moved to correspond to an interval between two apertures formed in the component to adjust an interval between the two pins and are filled into the two apertures, the test gripper may be aligned at a regular position with respect to the component.

Furthermore, according to an exemplary embodiment of the present disclosure, since a distance between the two pins 39 may be adjusted, the test gripper may be applied to various different components. Therefore, the gripper may be more flexibly used as compared with an existing scheme of the related art in which different grippers are required for each type of vehicle and component. Since the test gripper has a structure in which the pins may be fitted into the apertures, the test gripper may be aligned at a regular position with respect to the component every time, thereby making it possible to increase a precision of a test.

Figure 6:
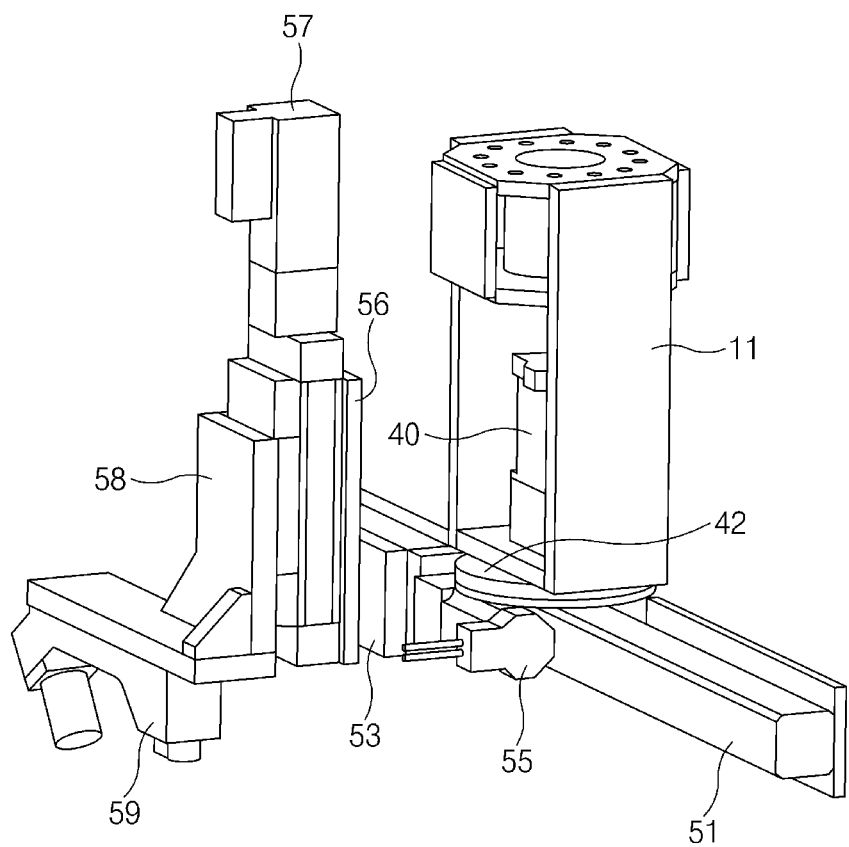
FIG. 6 is an exemplary view showing a state in which a pin module and one of two measuring sensors are omitted from the test gripper according to an exemplary embodiment of the present disclosure.
Figure 7:
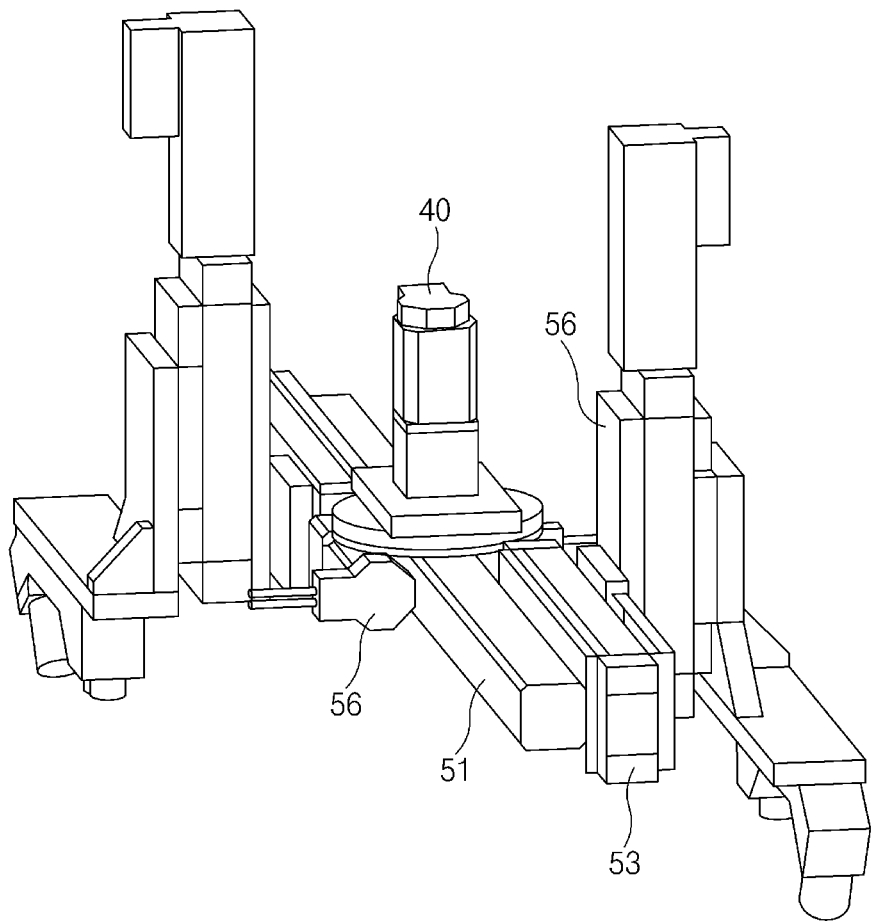
FIG. 7 is an exemplary view of the measuring module of the test gripper according to an exemplary embodiment of the present disclosure.
Figure 8:
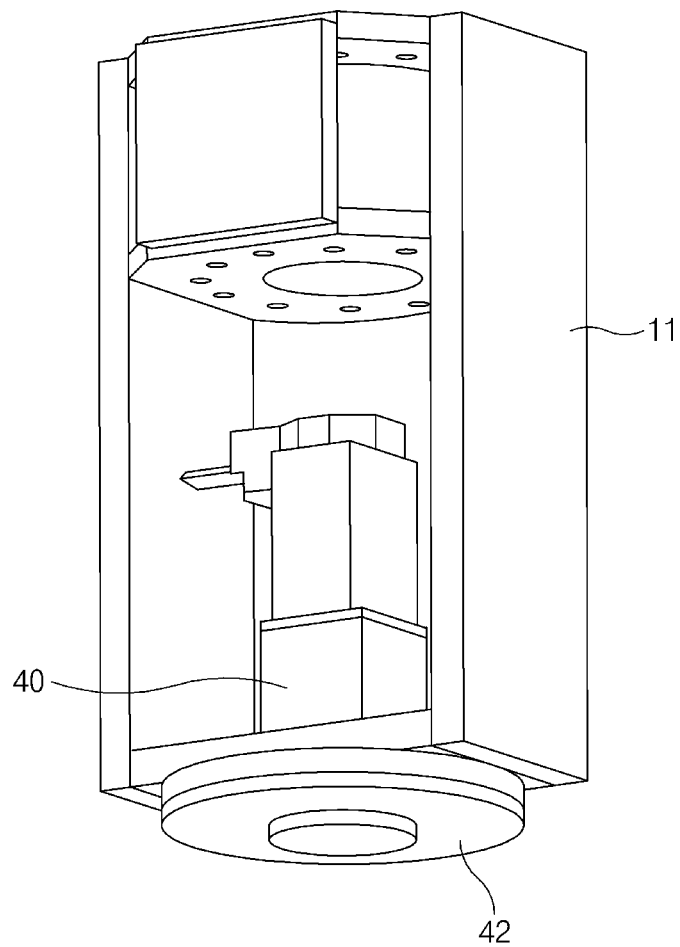
FIG. 8 is an exemplary view showing a state in which a motor and a decelerator are installed in a frame of the test gripper according to an exemplary embodiment of the present disclosure.

FIG. 6 is an exemplary view showing a state in which a pin module and one of two measuring sensors are omitted from the test gripper according to an exemplary embodiment of the present disclosure; FIG. 7 is an exemplary view of the measuring module of the test gripper according to an exemplary embodiment of the present disclosure; and FIG. 8 is an exemplary view showing a state in which a motor and a decelerator are installed in a frame of the test gripper according to an exemplary embodiment of the present disclosure.

The measuring module will be described herein below. In particular, a measuring module arm 51 for installing the measuring module may be installed on a lower surface of the frame 11. The measuring module arm 51 may be installed on the frame to be rotatable with respect to the frame 11, a motor 40 may be fixedly installed in the frame, a shaft of the motor may be exposed to the exterior of a lower surface of the motor while penetrating through an aperture of a lower portion of the frame, and a decelerator 42 may be connected to the shaft. In other words, driving parts for a rotating operation of the measuring module may be installed in a sequence of the motor 40, a frame lower member, and the decelerator 42.

The measuring module arm 51 may be installed at an output stage of the decelerator 42 and may be rotated with respect to the frame by driving of the motor. A rotation axis of the measuring module arm may coincide with (e.g., correspond to) a vertical direction of the frame 11. The measuring module arm may include horizontal rails 53 installed at both sides thereof. In addition, a vertical rail 56 may be installed on a guide slit formed on the horizontal rail 53 to be movable along the horizontal rail, and a vertical moving part 58 may be installed on the vertical rail 56 to be movable along the vertical rail 56.

The vertical rail 56 installed on the horizontal rail 53 may be moved along the horizontal rail 53 by a horizontal transfer apparatus 55 such as a linear motor, and the vertical moving part 58 installed on the vertical rail 56 may be transferred by a vertical transfer apparatus 57 to move along the vertical rail 56. Additionally, a measuring sensor 59 may be installed on the vertical moving part 58. Therefore, when the measuring module arm 51 is rotated without interfering in the pin 39, the vertical rail 56 may be moved in a horizontal direction, and the vertical moving part 58 may be moved in the vertical direction, the measuring sensor 59 may be moved to a desired position (e.g., a location when a next measurement is required).

Figure 10:
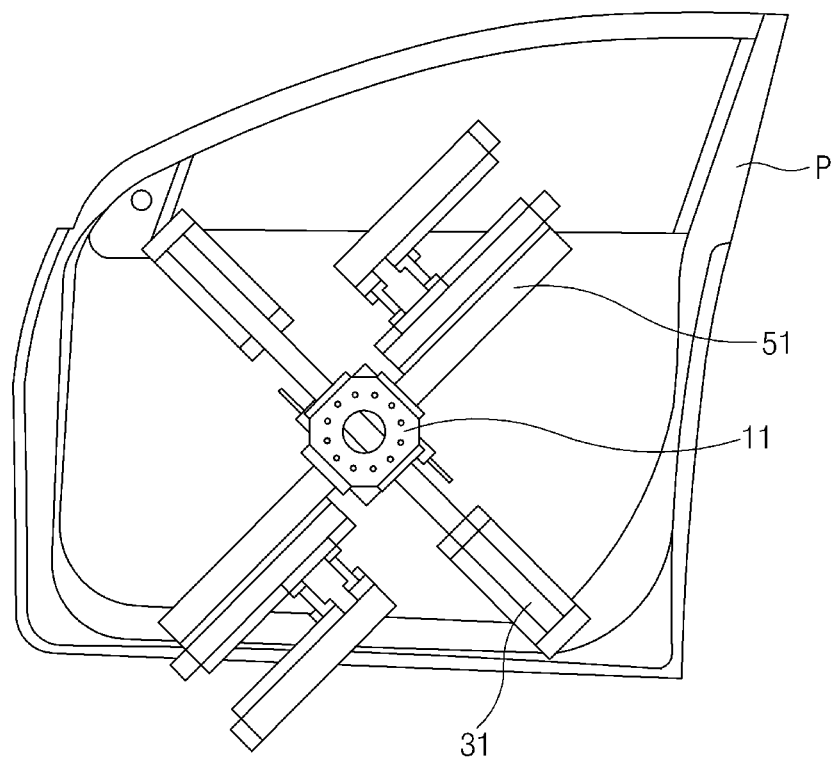
FIG. 10 is an exemplary view showing a state in which the test gripper according to an exemplary embodiment of the present disclosure is aligned on the component.

FIG. 9 is an exemplary view showing a state in which a pin of the test gripper according to an exemplary embodiment of the present disclosure is fitted into an aperture of a component; and FIG. 10 is an exemplary view showing a state in which the test gripper according to an exemplary embodiment of the present disclosure is aligned on the component. Next, a component test method using a test gripper according to an exemplary embodiment of the present disclosure will be described.

First, the test gripper 1 may be installed at an end portion of the robot arm R. The component to P may then be mounted using an appropriate method and the robot arm may be used to allow the test gripper to approach the component. The robot arm may then be configured to rotate the test gripper, thereby allowing the pin module arm 31 to be positioned above the aperture H of the component in the vertical direction. In particular, the transfer apparatus 35 may be operated to move the pin 39 to coincide with the position of the aperture H and lower the pin, thereby fitting the pin into the aperture. As a method of lowering the pin, there is a method of lowering the robot arm or lowering the pin by an apparatus (not shown) of vertically moving the pin with respect to the moving part 37.

Further, the motor 40 may be rotated to adjust an angle of the measuring module arm 51, each of the horizontal transfer apparatus 55 and the vertical transfer apparatus 57 may be operated to adjust a position of the measuring sensor installed on the vertical moving part 58 in horizontal and vertical directions, and a precision of the component may be measured by the measuring sensor 59. This moving structure may be operated to automatically follow a trajectory by a predetermined setting. Therefore, it may be possible to test components having other shapes when a pre-programmed trajectory is corrected.

As described above, according to exemplary embodiments of the present disclosure, three systems may be integrated into one gripper system, thereby making it possible to decrease an equipment cost. According to exemplary embodiments of the present disclosure, since the test gripper may be applied to various types of vehicles, it may be applied to a new vehicle, thereby making it possible to decrease an investment cost. Additionally, the component may be regulated by a fixing pin of the gripper, thereby making it possible to improve a precision even in a repeated test.

Although exemplary embodiments of the present disclosure have been described hereinabove, the present disclosure is not limited to the above-mentioned specific exemplary embodiments. That is, a number of modifications and alterations for the present disclosure may be made by those skilled in the art to which the present disclosure pertains without departing from the spirit and scope of the accompanying claims. In addition, it is to be considered that all of these modifications and alterations fall within the scope of the present disclosure.

What is claimed is:

1. A test gripper aligning and testing a component, comprising:
   a frame including a mounting part installed on a robot arm;
   a plurality of pins installed on the frame and fitted into apertures of the component to align the component and the test gripper;
   a measuring sensor installed on the frame and configured to test a precision of the component;
   a pin module arm is installed in the frame, the plurality of pins are installed on the pin module arm, and the number of pins is two or more;
   wherein the plurality of pins are installed to be movable in a lengthwise direction of the pin module arm along a rail installed on the pin module arm; and
   wherein the plurality of pins are installed on a moving part to be moved along the rail by a transfer apparatus.

2. The test gripper according to claim 1, wherein an apparatus vertically moving the pin is installed on the moving part.

3. The test gripper according to claim 1, wherein a measuring module arm is installed on the frame and the measuring sensor is installed on the measuring module.

4. The test gripper according to claim 3, wherein the measuring module arm is installed to be rotatable with respect to the frame.

5. The test gripper according to claim 4, wherein the measuring module arm is rotated by a motor installed in the frame.

6. The test gripper according to claim 4, wherein a vertical rail is installed on the measuring module arm in a direction perpendicular to a lengthwise direction of the measuring module arm and is in parallel with a rotation axis of the measuring module arm, and the measuring sensor is transferred along the vertical rail by a vertical transfer apparatus.

7. The test gripper according to claim 6, wherein a horizontal rail is installed in the lengthwise direction of the measuring module arm, and the vertical rail is moved along the horizontal rail by a horizontal transfer apparatus.

8. The test gripper according to claim 3, wherein a horizontal rail is installed at the measuring module arm in a lengthwise direction of the measuring module arm, and the measuring sensor is moved by a horizontal transfer apparatus along the horizontal rail.

9. A component test method using the test gripper according to claim 1, comprising:
   allowing the test gripper to approach a fixed component;

fitting the pin into the aperture of the component to align the component and the test gripper; and testing a precision of the component using the measuring sensor.

10. The component test method according to claim 9, wherein the method includes lowering the pin with respect to the gripper to fit the pin into the aperture.

11. The component test method according to claim 9, wherein the method includes installing a measuring module arm on the frame and the measuring sensor on the measuring module.

12. The component test method according to claim 11, wherein the method includes adjusting a position of the measuring sensor based on rotation of the measuring module arm.

13. The component test method according to claim 12, wherein the method includes adjusting the position of the measuring sensor based on movement in a vertical direction perpendicular to a lengthwise direction of the measuring module arm and a lengthwise direction of a measuring direction.

14. The component test method according to claim 9, wherein the method includes installing a pin module arm in the frame, two or more pins on the pin module arm.

15. A test gripper aligning and testing a component, comprising:
    a frame including a mounting part installed on a robot arm;
    a plurality of pins installed on the frame and fitted into apertures of the component to align the component and the test gripper;
    a measuring sensor installed on the frame and configured to test a precision of the component;
    a pin module arm is installed in the frame, the plurality of pins are installed on the pin module arm, and the number of pins is two or more;
    wherein the plurality of pins are installed to be movable in a lengthwise direction of the pin module arm along a rail installed on the pin module arm;
    wherein the plurality of pins are installed on a moving part to be moved along the rail by a transfer apparatus; and
    wherein an apparatus vertically moving the pin is installed on the moving part.

16. A test gripper aligning and testing a component, comprising:
    a frame including a mounting part installed on a robot arm;
    a plurality of pins installed on the frame and fitted into apertures of the component to align the component and the test gripper;
    a measuring sensor installed on the frame and configured to test a precision of the component;
    a in module arm is installed in the frame, the plurality of pins are installed on the pin module arm, and the number of pins is two or more;
    wherein the plurality of pins are installed to be movable in a lengthwise direction of the pin module arm along a rail installed on the pin module arm;
    wherein the plurality of pins are installed on a moving part to be moved along the rail by a transfer apparatus; and
    wherein a measuring module arm is installed on the frame and the measuring sensor is installed on the measuring module.

* * * * *